(12) United States Patent
Lee et al.

(10) Patent No.: US 7,233,666 B2
(45) Date of Patent: Jun. 19, 2007

(54) METHOD AND APPARATUS FOR INCREASING THE ENTROPY OF A PSEUDORANDOM NUMBER

(75) Inventors: David A. Lee, Portland, OR (US); Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 10/448,780

(22) Filed: May 29, 2003

(65) Prior Publication Data

US 2004/0240667 A1 Dec. 2, 2004

(51) Int. Cl.
*H04L 9/00* (2006.01)
(52) U.S. Cl. .......................... 380/46; 713/168
(58) Field of Classification Search ................ 713/168, 713/170, 193–194; 726/27–30, 34; 380/46; 708/250
See application file for complete search history.

(56) References Cited

U.S. PATENT DOCUMENTS

| | | | | |
|---|---|---|---|---|
| 6,073,237 A | * | 6/2000 | Ellison | 713/171 |
| 6,792,533 B2 | * | 9/2004 | Jablon | 713/171 |
| 6,916,247 B2 | * | 7/2005 | Gatto et al. | 463/42 |

* cited by examiner

*Primary Examiner*—Hosuk Song
(74) *Attorney, Agent, or Firm*—Blakely, Sokoloff, Taylor & Zafman LLP

(57) ABSTRACT

A method and apparatus for increasing the entropy of a pseudorandom number (PRN). An intervener unit receives one or more signals from an authenticating device during a false authentication attempt. The intervener unit generates, in response to the one or more signals, a first PRN with an associated level of entropy, and transmits the first PRN to the authenticating device. The entropy level of the first PRN causes the authenticating device to generate during a subsequent authentication attempt a second PRN with a greater level of entropy than the first PRN.

29 Claims, 4 Drawing Sheets

METHOD AND APPARATUS FOR INCREASING THE ENTROPY OF A PSEUDORANDOM NUMBER

TECHNICAL FIELD

Embodiments of the invention are generally related to the field of cryptography and, in particular, to a pseudorandom number generator of a cryptographic system.

BACKGROUND

Cryptography is the science of information security in which cryptographic systems are developed to protect data from unauthorized requesters. One aspect of cryptography is encryption, which provides data confidentiality. With encryption, a computer system converts input data, e.g., text or video content, into encrypted data, commonly referred to as cipher data. The cipher data is transmitted to another computer system, which cannot decrypt the cipher data without the proper key.

Another aspect of cryptography is authentication, which protects the access to data. Authentication involves a process to determine whether a requester is authorized to have its request fulfilled, e.g., whether the requester is authorized to receive or access data. Some cryptographic systems use a random or pseudorandom number as part of an authentication process. A pseudorandom number, which is produced by a pseudorandom number generator, is a number whose possible values may not have an equal chance of occurring, and may be predictable in that one pseudorandom number is useful in determining the value of a subsequent pseudorandom number. When used as part of an authentication process in a cryptographic system, a pseudorandom number should be as unpredictable as possible.

Entropy is a measure of unpredictability. To provide a high level of entropy, a pseudorandom number generator should generate pseudorandom numbers whose possible values have an equal chance of occurring, and past pseudorandom numbers should not be useful in predicting subsequent pseudorandom numbers. In other words, a pseudorandom number generated by a pseudorandom number generator should be indistinguishable from a random number produced by a random number generator. Because a pseudorandom number generator typically has its initial state established, or "seeded," by gathering truly random data from its physical environment, a pseudorandom number generator may be compromised if there is insufficient entropy in its initial state or "seed." However, the pseudorandom number generator may be influenced by ongoing operations, and thus may pick up additional truly random data from its environment as it continues to operate, thereby enhancing its unpredictability.

If a pseudorandom number used as part of an authentication process is not generated with a sufficient level of entropy, an unauthorized requester that gains access to the communication between, for example, a transmitter and a requester of data from the transmitter, may be able to become authenticated during an authentication process that uses the pseudorandom number. For example, using a pseudorandom number generated with insufficient entropy, an unauthorized computer system might be able to limit the possible values of subsequently generated pseudorandom numbers and predict a subsequently generated pseudorandom number. This would, in accordance with an example authentication protocol, enable the unauthorized computer system to impersonate the transmitter by sending the predicted pseudorandom number to the receiver. Because the predicted pseudorandom number has the value of a pseudorandom number that could have come from the transmitter, the receiver would send to the unauthorized computer system a response that would be valid if the pseudorandom number had come from the transmitter.

The unauthorized computer system could thus impersonate the receiver by sending to the transmitter the receiver's response to the predicted pseudorandom number. As a result, the unauthorized computer system would be authenticated as an authorized recipient of data from the transmitter. Thus, a pseudorandom number should be generated with a sufficient level of entropy such that the pseudorandom number cannot be used to determine the value of a subsequently generated pseudorandom number.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method and apparatus for increasing the entropy of a pseudorandom number is described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

An authentication device in a cryptographic system uses a pseudorandom number (PRN) during an authentication process to determine whether to fulfill the request of a requester. The authentication process is such that the entropy level of a first PRN injected into the authentication process prior to an actual authentication attempt increases the entropy level of a second PRN generated during an actual authentication attempt.

An intervener unit causes, e.g., by requesting data or access to data that involves authenticating the requester prior to providing the data or access to the data, or by coupling with a transmission path along which the transmitter communicates with a requester, the authentication device to initiate a false authentication attempt. The authentication attempt is false in that it is executed to increase the entropy of a PRN generated during an actual authentication attempt, rather than to determine whether to fulfill the request of a requester.

An authentication unit in the authenticating device generates one or more signals to initiate the false authentication. The authenticating device transmits the one or more signals to the intervener unit. The intervener unit receives the one or more signals and responds by sending to the authenticating device an entropy PRN generated with a certain level of entropy.

The authenticating device receives the entropy PRN. The entropy level of the entropy PRN causes the authenticating device to increase the entropy level in an authenticating PRN subsequently generated during an actual authentication attempt. Thus, an authenticating PRN will be generated with increased entropy during an actual authentication attempt, as compared to the entropy level of an authenticating PRN generated without first receiving an entropy PRN during a false authentication attempt. Consequently, it will be increasingly difficult for an unauthorized requester, for example, an eavesdropping system, to determine the authenticating PRN and receive data or access to data.

The intervener unit may cause the authenticating device to initiate a false authentication attempt, or the false authentication attempt may otherwise be initiated, any number of times to enable the authenticating device to generate an authenticating PRN generated with a predetermined level of entropy. When not in use to increase the entropy of an authenticating PRN, the intervener unit allows communication between the authenticating device and a requester.

Figure 1:
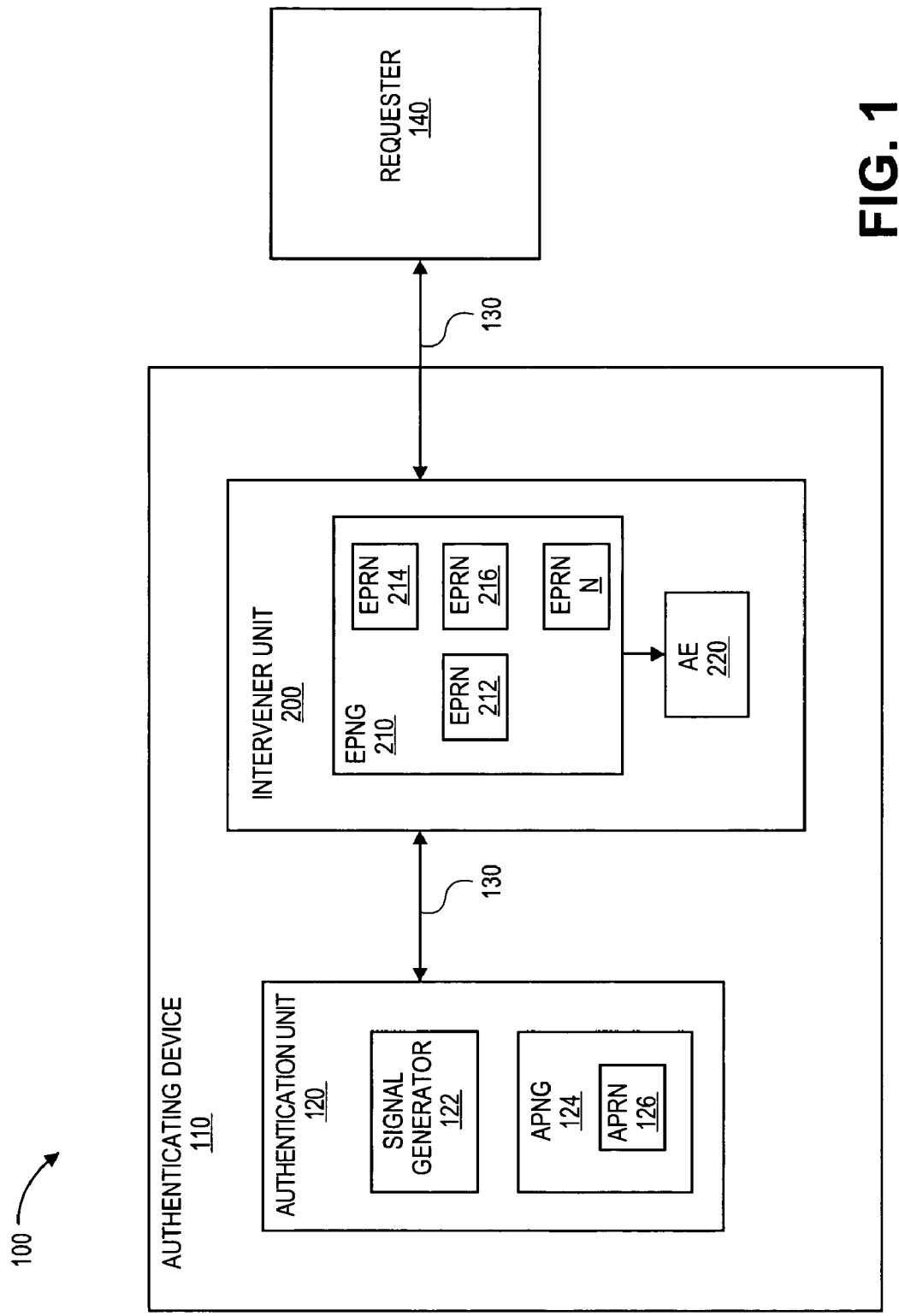
FIG. 1 is a block diagram illustrating one embodiment of a cryptographic system.

FIG. 1 is a block diagram illustrating one embodiment of a cryptographic system. Cryptographic system 100 uses a pseudorandom number as part of its authentication process, wherein the entropy level of a first PRN injected into the authentication process prior to an actual authentication attempt increases the entropy level of a second PRN generated during an actual authentication attempt.

Cryptographic system 100 includes authenticating device (AD) 110. AD 110 may be an electronic system, including a personal computer, a personal digital assistant (PDA), a laptop or palmtop computer, a cellular phone, a computer system, a workstation or a network access device. In addition, AD 110 may be a modem, e.g., a cable modem or telephone-line modem, a set-top box, e.g., a digital cable television or digital satellite television receiver. In one embodiment, AD 110 receives input data and encrypts the data for transmission to an authorized requester of the data. In another embodiment, AD 110 sends unencrypted data to an authorized requester. In yet another embodiment, AD 110 provides a requester with access to data that the requester is authorized to access.

AD 110 includes authentication unit (AU) 120. AU 120 further includes signal generator 122 and authenticating pseudorandom number generator (APNG) 124. Signal generator 122 produces one or more signals to initiate an authentication process. APNG 124 produces authentication pseudorandom number (APRN) 126, which is used during the authentication process. Although AU 120 is described as a component of AD 110, AU 120 may be a device separate from AD 110 that executes an authentication process and communicates with AD 110 regarding whether a requester is authorized to have AD 110 fulfill its request. In addition, although signal generator 120 and APNG 124 are described as separate elements, they may be combined into a signal multifunctional element.

Cryptographic system 100 further includes transmission path 130 and requester 140. Requester 140 may be an electronic device, including those mentioned above, a television, or a display device, such as a cathode ray tube (CRT) or liquid crystal display (LCD), to display information to a user of an electronic device. Transmission path 130 may be a wired connection, e.g., a bus interface; a connector cable; a phone line or a coaxial cable; or a wireless connection, between AD 110 and requester 140. Transmission path 130 couples AD 110 with requester 140, and is the path along which authenticating device 110 transmits one or more signals and/or APRN 126 during a false or actual authentication attempt.

Cryptographic system 100 may include a single transmission path 130 to carry, APRN 126 and, for example, data to an authenticated requester 140, or transmission path 130 may carry APRN 126, while a separate transmission path carries data, or vice versa. In addition, although cryptographic system 100 is described in terms of one AD 110 coupled with one requester 140, cryptographic system 100 may include one AD 110 coupled directly with more than one requester 140, or communicating with an intermediate device, e.g., a repeater, that communicates with one or more requesters 140.

AD 110 includes intervener unit 200. Intervener unit 200 causes AD 110 to initiate a false authentication attempt. Intervener unit 200 includes entropy pseudorandom number generator (EPNG) 210 and authentication emulator (AE) 220. EPNG 210 is a pseudorandom number generator that produces EPRN 212, EPRN 214, EPRN 216 through EPRN n, where n is any number of pseudorandom numbers produced by EPNG 210.

AE 220 transmits, e.g., EPRN 212 to AD 110 via transmission path 130. Although cryptographic system 100 is described in terms of a single transmission path 130 to carry, e.g., EPRN 212 and APRN 126, transmission path 130 may carry APRN 126, while a separate transmission path carries EPRN 212, or vice versa. In addition, although RPNG 210 and AE 220 are described as separate components, EPNG 210 and AE 220 may be combined into a single component. Although intervener unit 200, EPNG 210 and AE 220 are described as components implemented in hardware, one or more of these components may be implemented in software, e.g., in a network stack.

Figure 2:
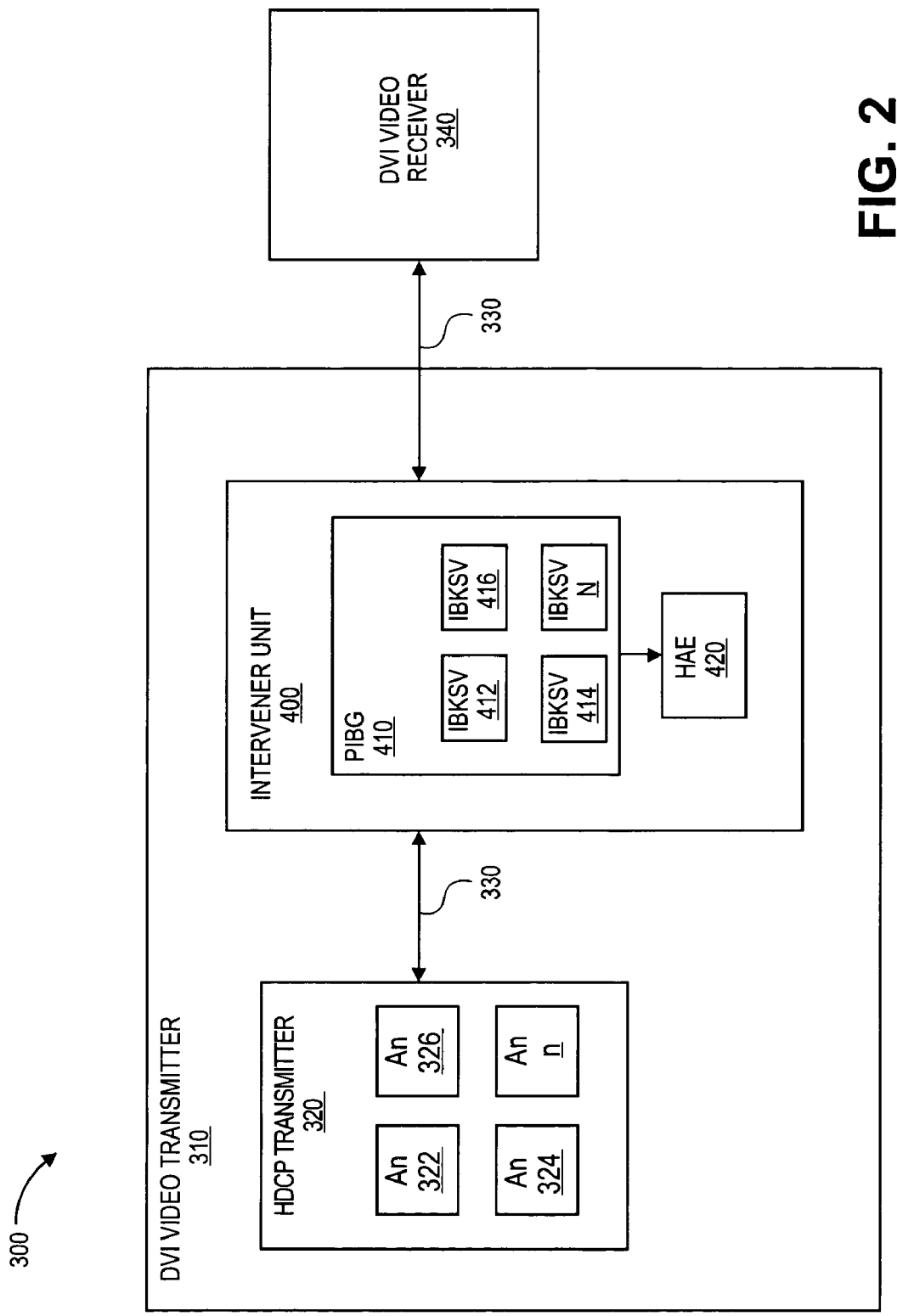
FIG. 2 is a block diagram illustrating one embodiment of a cryptographic system as a high-bandwidth digital content protection (HDCP) system.

FIG. 2 is a block diagram illustrating one example embodiment of cryptographic system 100 as a high-bandwidth digital content protection (HDCP) system. See, e.g., High-bandwidth Digital Content Protection System, Revision 1.0, Feb. 17, 2000. A HDCP system is an example of a cryptographic system that uses a PRN as part of its authentication process. Although the following example embodiment describes cryptographic system 100 as an HDCP system, embodiments of the invention may be used with other cryptographic systems, including, but not limited to, a signature authentication system, provided that such other cryptographic systems use an authentication process in which the entropy level of a first PRN injected into the authentication process prior to an actual authentication attempt increases the entropy level of a second PRN generated during an actual authentication attempt.

HDCP protects video data transmitted from a host (a HDCP video transmitter) to a display device (a HDCP video receiver). The HDCP video transmitter and HDCP video receiver are coupled via a HDCP connector, e.g., a digital video interface (DVI) connector or a high definition multimedia interface (HDMI) connector. See, e.g., Digital Display Working Group, "Digital Visual Interface 1.0 Specification," Apr. 2, 1999; HDMI Founders, "HDMI v 1.0 Specification," Dec. 9, 2002.

In an HDCP system, an authentication protocol is used to indicate to the HDCP video transmitter that a given HDCP video receiver is authorized to receive encrypted video data. The HDCP video transmitter begins in an idle state, and waits for an event to trigger the authentication protocol, where triggering events include, e.g., completion of certain phases of an operating system at startup or the hot-plug detection of a video receiver.

Upon the occurrence of a triggering event, the HDCP video transmitter initiates the authentication protocol. Specifically, an HDCP transmitter within the HDCP video transmitter generates a 64-bit pseudorandom value (An). The HDCP video transmitter sends to the HDCP video receiver, via an inter-integrated circuit (I²C) serial bus interface (see, e.g., Philips Semiconductor, I²C -Bus Specification, Version 2.1, January 2000), an initiation message that includes the An and a key selection vector (KSV), which is a 40-bit binary value assigned by the Digital Content Protection LLC to identify a device. A HDCP video transmitter's assigned KSV is known as the AKSV. A KSV contains a predetermined number of one and zeros. For example, in HDCP Revision 1.0, a KSV contains 20 ones and 20 zeros.

The HDCP video receiver responds to receipt of An and the AKSV by sending a response message that includes the HDCP video receiver's assigned KSV, known as the BKSV. The HDCP video transmitter verifies the BKSV. If the BKSV does not contain 20 zeros and 20 ones, authentication fails, and the HDCP video transmitter returns to the idle state to wait for another triggering event. However, if the BKSV contains 20 zeros and 20 ones, the HDCP video transmitter and the HDCP video receiver compute certain values based on, among other things, An and the other device's KSV.

The HDCP video receiver sends its computed values to the HDCP video transmitter. The HDCP video transmitter compares its computed values to the HDCP video receiver's computed values, and determines whether the BKSV is on a list of revoked BKSVs. If the computed values do not match, authentication fails and the HDCP video transmitter returns to the idle state. However, if the computed values match, and the BKSV has not been revoked, the HDCP video transmitter delivers encrypted content to the HDCP video receiver.

HDCP system 300 includes HDCP video transmitter 310, such as those devices mentioned previously as examples of AD 110, that complies with the HDCP specification. HDCP video transmitter 310 includes HDCP transmitter 320, which produces An 322, An 324, An 326 through An n, where n is any number of pseudorandom numbers produced by HDCP transmitter 320. There is no restriction or requirement regarding the number of Ans that may be produced by HDCP transmitter 320.

HDCP system 300 further includes I²C serial bus 330 of a HDCP connector (not shown), and HDCP video receiver 340. HDCP video receiver 340 is typically a display device, such as those mentioned previously, of a computer system, where the display device complies with the HDCP specification. HDCP video transmitter 310 sends, e.g., An 322 via I²C serial bus 330 during an HDCP authentication protocol to determine whether HDCP video receiver 340 is authorized to receive encrypted data from HDCP video transmitter 310.

HDCP video transmitter 310 includes intervener unit 400, which couples with I²C serial bus 330 to intercept, e.g., An 322 before it arrives at HDCP video receiver 340. Intervener unit 400 includes pseudorandom invalid BKSV generator (PIBG) 410 and HDCP authentication emulator (HAE) 420. PIBG 410 produces invalid BKSV (IBSKV) 412, IBKSV 414, IBKSV 416 through IBSKV n, which are generated with a certain level of entropy, where n is any number of IBKSVs produced by PIBG 410. There is no restriction or requirement regarding the number of IBKSVs that may be produced by PIBG 410. IBKSV 412 through IBKSV n are invalid, for example, because they fail to include 20 ones and 20 zeros. Because of its low probability of being valid for authentication purposes, an IBKSV causes an authentication attempt to fail. HAE 420 transmits, e.g., IBKSV 412 to HDCP video transmitter 310 via I²C serial bus 330.

Although PBG 410 and HAE 420 are described as separate components, PIBG 410 and HAE 420 may be combined into a single component. Although intervener unit 400, PIBG 410 and HAE 420 are described as components implemented in hardware, one or more of these components may be implemented in software, e.g., in a network stack.

Figure 3:
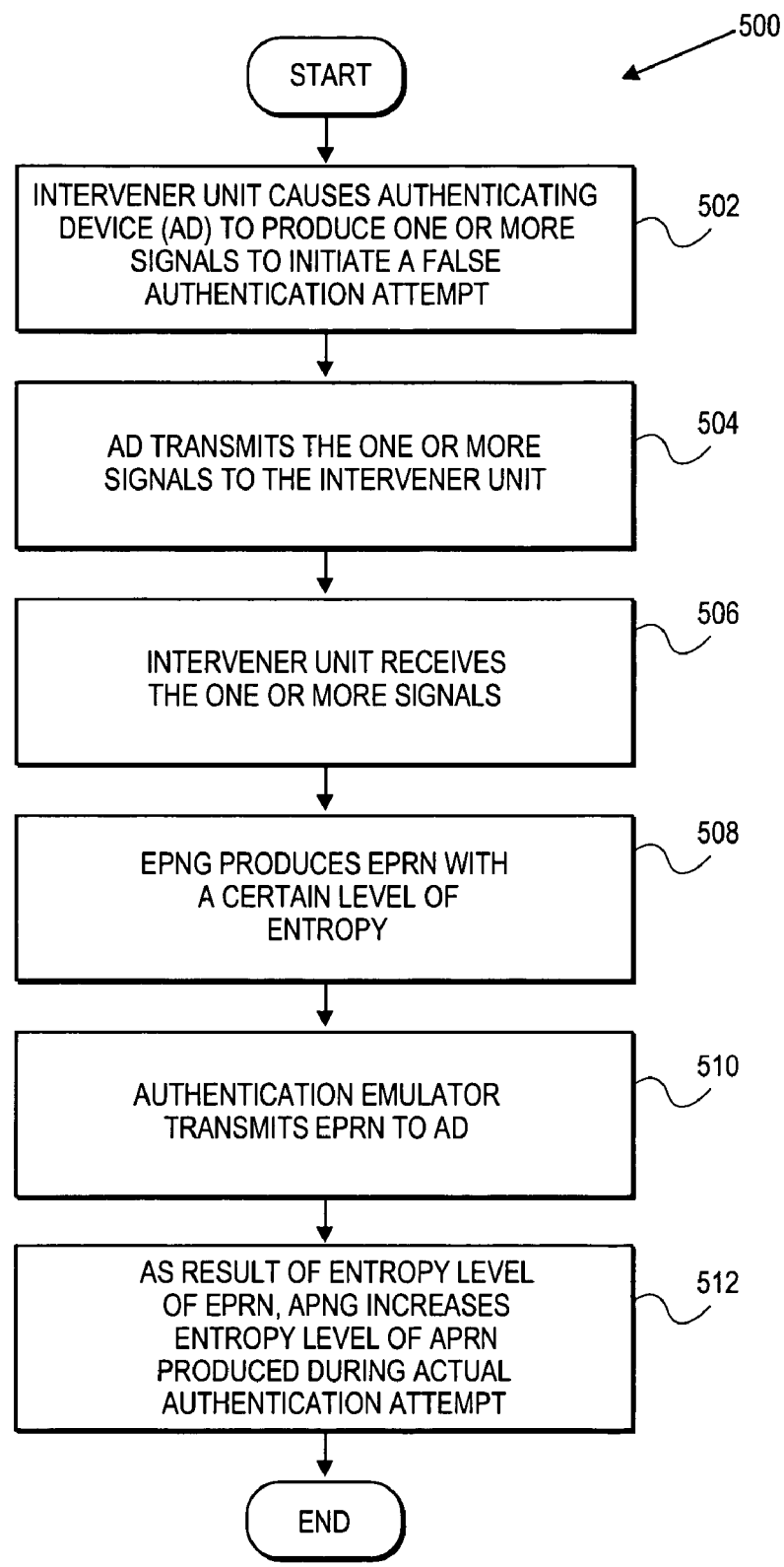
FIG. 3 is a flow chart illustrating one embodiment of a method of increasing the entropy of a pseudorandom number.

FIG. 3 is a flow chart illustrating one embodiment of a method of increasing the entropy of a PRN. At 502 of method 500, intervener unit 200 causes AD 110 to produce one or more signals to initiate a false authentication attempt. In one embodiment, intervener unit 200 causes AD 110 to initiate the false authentication attempt by requesting data or access to data that involves AD 110 authenticating a requester prior to providing the data or access to the data. In another embodiment, intervener unit 200 causes AD 110 to initiate the false authentication attempt by coupling with transmission path 130. Although an embodiment of the invention is described in terms of intervener unit 200 causing AD 110 to initiate the false authentication attempt, other causes, e.g., the detection of requester 140, may result in AD 110 initiating the false authentication attempt.

At 504, AD 110 transmits the one or more signal to intervener unit 200. At 506, intervener unit 200 receives the one or more signals. At 508, EPNG 210 produces a EPRN, e.g., EPRN 212, generated with a certain level of entropy, wherein EPRN 212 represents one of EPRN 212 through EPRN n. At 510, AE 220 transmits EPRN 212 to AD 110.

At 512, as a result of the entropy level of EPRN 212, APNG 124 increases the entropy level of APRN 126 produced during an actual authentication attempt. APRN 126 is generated with an entropy level that includes at least the entropy level of EPNG 212. Intervener unit 200 may cause AD 110 to initiate a false authentication attempt, or the authentication attempt may otherwise be initiated, any number of times to enable APNG 124 to further increase the entropy level of APRN 126.

When not in use to enable APNG 124 to increase the entropy of APRN 126, intervener unit 200 allows AD 110 to communicate with requester 140. When APRN 126 passes through to a requester during an actual authentication attempt, the ability to generate an APRN with an increased entropy level is lost, and the false authentication attempt should be executed again if increased entropy is desired for an APRN to be generated during the next actual authentication attempt.

The following example describes method 500 in terms of HDCP system 300. However, method 500 may be used with other cryptographic systems, including, but not limited to, a signature authentication system, provided that such other cryptographic systems use an authentication process in which the entropy level of a first PRN injected into the authentication process prior to an actual authentication attempt increases the entropy level of a second PRN generated during an actual authentication attempt.

At 502, HDCP video transmitter 310 detects intervener unit 400 coupled with I²C serial bus 330. This causes at 504 HDCP transmitter 320 to initiate a false authentication attempt by transmitting an An, e.g., An 322, wherein An 322 represents one of An 322 through An n, and an AKSV (not shown) over I²C serial bus 330. Although an embodiment of the invention is described in terms of intervener unit 400 causing HDCP video transmitter 310 to initiate the false authentication attempt, other causes, e.g., hot-plug detection of a HDCP video receiver 340, or completion of certain phases of HDCP video receiver 310's operating system at startup, may result in the initiation of the authentication attempt.

At 506, intervener unit 400 intercepts An 322. At 508, PIBG 410 produces an IBKSV, e.g., IBKSV 412, generated with a certain entropy level, wherein IBKSV 412 represents one of IBKSV 412 through IBSKV n. At 510, HAE 420 transmits IBKSV 412 to HDCP transmitter 320, to impersonate HDCP video receiver 340. Because of the low probability of IBSKV 412 being valid for authentication purposes, authentication fails, and HDCP video transmitter 310 does not send data to intervener unit 400.

At 512, as a result of the entropy level in IBSKV 412, HDCP transmitter 320 increases the entropy of an An from among An 322 through An n produced during a subsequent authentication attempt, where the An from among An 322 through An n produced during the subsequent authentication attempt has entropy level that includes at least the entropy level of IBKSV 412.

Intervener unit 400 may initiate a false authentication attempt, or the false authentication attempt may otherwise be initiated, any number of times to enable PNG 320 to increase the entropy level of a subsequent An 322 through An n. When not in use to enable HDCP transmitter 320 to increase the entropy of an An, intervener unit 400 allows an An to pass through to a potential HDCP video receiver during an actual authentication attempt. When an An passes through to a HDCP video receiver during an actual authentication attempt, the ability to generate an An with an increased entropy level is lost, and the false authentication attempt should be executed again if increased entropy is desired for an An to be generated during the next actual authentication attempt.

FIG. 3 describes example embodiments of the invention in terms of a method. However, one should also understand it to represent a machine-accessible storage medium having recorded, encoded or otherwise represented thereon instructions, routines, operations, control codes, or the like, that when executed by or otherwise utilized by an electronic system, cause the electronic system to perform the methods as described above or other embodiments thereof that are within the scope of this disclosure.

Figure 4:
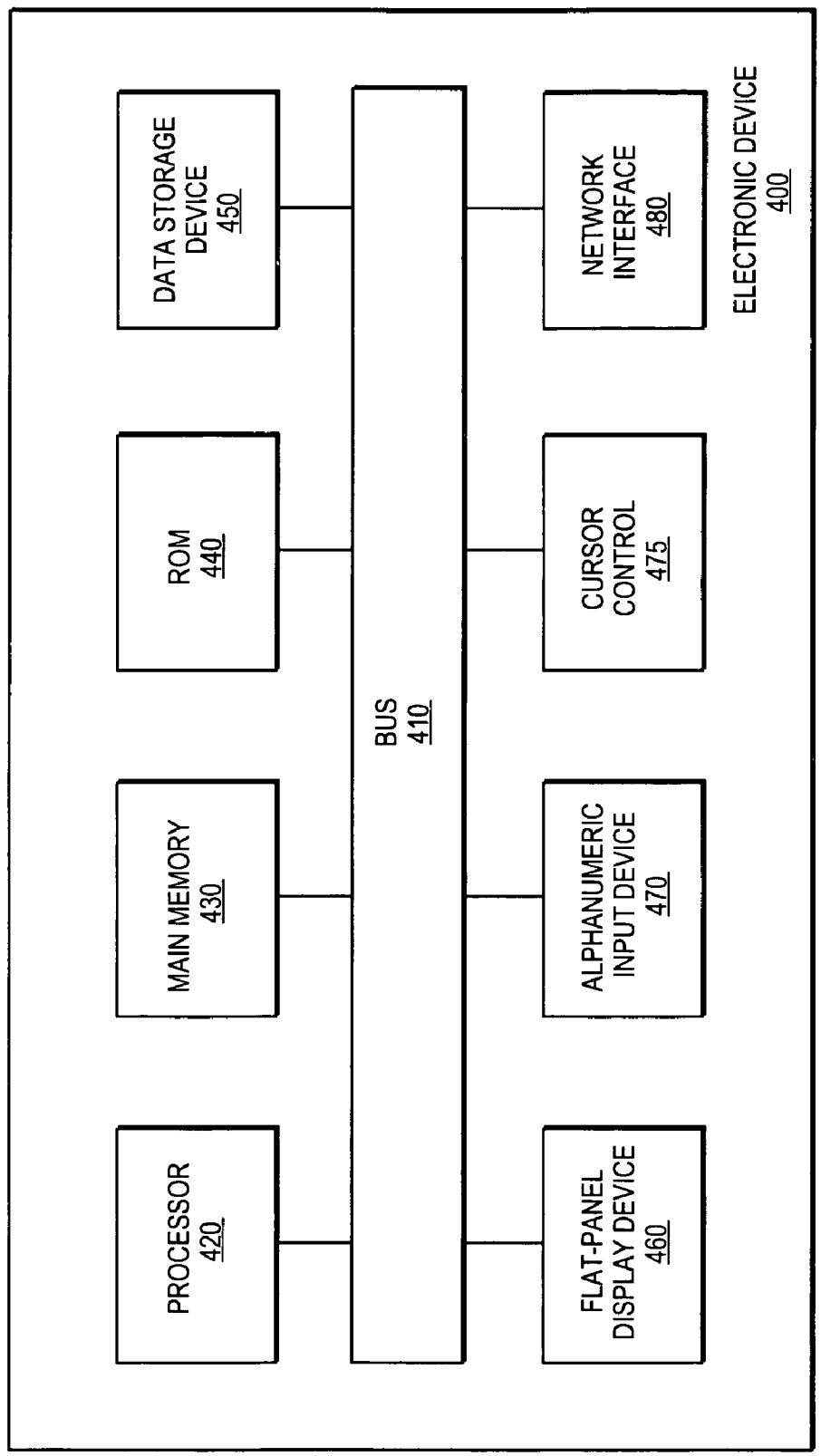
FIG. 4 is a block diagram illustrating one embodiment of an electronic system.

FIG. 4 is a block diagram of one embodiment of an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. The methods of FIG. 3 can be implemented as sequences of instructions executed by the electronic system. The sequences of instructions can be stored by the electronic system, or the instructions can be received by the electronic system (e.g., via a network connection). The electronic system can be coupled to a wired or wireless network.

Electronic system 400 includes a bus 410 or other communication device to communicate information, and processor 420 coupled to bus 410 to process information. While electronic system 400 is illustrated with a single processor, electronic system 400 can include multiple processors and/or co-processors.

Electronic system 400 further includes random access memory (RAM) or other dynamic storage device 430 (referred to as memory), coupled to bus 410 to store information and instructions to be executed by processor 420. Memory 430 also can be used to store temporary variables or other intermediate information while processor 420 is executing instructions. Electronic system 400 also includes read-only memory (ROM) and/or other static storage device 440 coupled to bus 410 to store static information and instructions for processor 420. In addition, data storage device 450 is coupled to bus 410 to store information and instructions. Data storage device 450 may comprise a magnetic disk (e.g., a hard disk) or optical disc (e.g., a CD-ROM) and corresponding drive.

Electronic system 400 may further comprise a display device 460, such as a cathode ray tube (CRT) or liquid crystal display (LCD), to display information to a user. Alphanumeric input device 470, including alphanumeric and other keys, is typically coupled to bus 410 to communicate information and command selections to processor 420. Another type of user input device is cursor control 475, such as a mouse, a trackball, or cursor direction keys to communicate direction information and command selections to processor 420 and to control cursor movement on flat-panel display device 460. Electronic system 400 further includes network interface 480 to provide access to a network, such as a local area network or wide area network.

Instructions are provided to memory from a machine-accessible storage medium, or an external storage device accessible via a remote connection (e.g., over a network via network interface 480) providing access to one or more electronically-accessible media, etc. A machine-accessible storage medium includes any mechanism that provides (i.e., stores and/or transmits) information in a form readable by a machine (e.g., a computer). For example, a machine-accessible medium includes RAM; ROM; magnetic or optical storage medium; flash memory devices; etc.

In alternative embodiments, hard-wired circuitry can be used in place of or in combination with software instructions to implement the embodiments of the invention. Thus, the embodiments of the invention are not limited to any specific combination of hardware circuitry and software instructions.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, are to be regarded in an illustrative rather than a restrictive sense.

What is claimed is:

1. A method comprising:
   receiving one or more signals from an authenticating device during a false authentication attempt;
   generating, in response to the one or more signals, a first pseudorandom number (PRN) with an associated entropy level;
   transmitting the first PRN to the authenticating device; and
   causing, as a result of the entropy level of the first PRN, the authenticating device to generate during a subsequent authentication attempt a second PRN with a greater level of entropy than the first PRN.

2. The method of claim 1, wherein causing, as a result of the entropy of the first PRN, the authenticating device to generate during the subsequent authentication attempt the second PRN with the greater level of entropy than the first PRN comprises causing the authenticating device to generate a second PRN having an entropy level that includes at least the entropy level of the first PRN.

3. The method of claim 1, further comprising repeating the method of claim 1 until the authenticating device is able to generate a PRN with a predetermined level of entropy.

4. The method of claim 1, further comprising causing the authentication device to transmit the one or more signals to initiate the false authentication attempt.

5. The method of claim 4, wherein causing the authentication device to initiate the false authentication attempt comprises requesting data that the authenticating device transmits only after determining that a requestor is authorized to receive the data.

6. The method of claim 4, wherein causing the authentication device to initiate the false authentication attempt comprises requesting access to data to which the authenticating device provides access only after determining that a requestor is authorized to access the data.

7. A method comprising:
  intercepting a first An from a HDCP video transmitter a false authentication attempt;
  generating, in response to the An, an invalid BKVS generated with an associated level of entropy;
  transmitting the invalid BKVS to the HDCP transmitter; and
  causing, as a result of the entropy level of the invalid BKVS, the HDCP transmitter to produce during a subsequent authentication attempt a second An with a greater level of entropy than the first An.

8. The method of claim 7, further comprising causing the HDCP transmitter to initiate the false authentication attempt.

9. The method of claim 8, wherein causing the HDCP transmitter to initiate the false authentication attempt comprises coupling with a transmission path along which the HDCP transmitter sends an An to a HDCP receiver.

10. The method of claim 9, further comprising allowing the second An to pass through to the HDCP receiver during an actual attempt to authenticate the HDCP receiver.

11. An apparatus comprising:
  an intervener unit, to receive one or more signals from an authenticating device during a false authentication attempt, comprising:
    a pseudorandom number generator (PNG) to produce, in response to the communication, a first pseudorandom number (PRN) with an associated level of entropy; and
    an authentication emulator coupled with the PNG, to transmit the first PRN to the authenticating device and cause, as a result of the entropy level of the first PRN, the authenticating device to generate during a subsequent authentication attempt a second PRN with a greater level of entropy than the first PRN.

12. The apparatus of claim 11, wherein the second PRN with the greater level of entropy than the first PRN comprises a second PRN with an entropy level that includes at least the entropy level of the first PRN.

13. The apparatus of claim 11, wherein the first PRN is used to authenticate a potential recipient of data from the authenticating device.

14. The apparatus of claim 13, wherein the data comprises encrypted video data.

15. The apparatus of claim 14, wherein the authenticating device comprises a high-bandwidth digital content protection system (HDCP) video transmitter.

16. The apparatus of claim 15, wherein the first PRN and the second PRN comprise Ans.

17. The apparatus of claim 16, wherein the first PRN comprises an invalid key selection vector (KSV) that fails to comply with the form of a valid KSV.

18. The apparatus of claim 17, wherein the invalid KSV fails to include 20 ones and 20 zeros.

19. A system comprising:
  a personal computer to send encrypted data;
  a receiver, to receive the encrypted data; and
  a transmission path to communicatively couple the personal computer and the receiver, wherein the personal computer comprises:
    a signal generator to produce one or more signals transmitted via the transmission path during a false authentication attempt;
    a pseudorandom number generator (PNG) to produce, in response to the one or more signals, a first pseudorandom number (PRN) with an associated level of entropy; and
    an authentication emulator coupled with the PNG, to transmit the first PRN to the authenticating device and cause, as a result of the entropy level of the first PRN, the authenticating device to generate during a subsequent authentication attempt a second PRN with a greater level of entropy than the first PRN.

20. The system of claim 19, wherein the data comprises encrypted video data.

21. The system of claim 20, wherein the personal computer comprises a high-bandwidth digital content protection system (HDCP) video transmitter.

22. The system of claim 21, wherein the receiver comprises a HDCP display device of the personal computer.

23. The system of claim 22, wherein the transmission path comprises an I2C serial interface bus.

24. The system of claim 19, wherein the personal computer further comprises another PNG to produce the second PRN.

25. An article of manufacture comprising:
  a machine-accessible storage medium including thereon sequences of instructions that, when executed, cause an electronic system to:
    receive one or more signals from an authenticating device during a false authentication attempt;
    generate, in response to the one or more signals, a first pseudorandom number (PRN) having an associated entropy level;
    transmit the first PRN to the authenticating device; and
    cause, as a result of the entropy level of the first PRN, the authenticating device to generate during a subsequent authentication attempt a second PRN with a greater level of entropy than the first PRN.

26. The article of manufacture of claim 25, wherein the machine-accessible storage medium further comprises sequences of instructions that, when executed, cause the electronic system to repeat the sequences of instructions until the authenticating device is able to generate a PRN with a predetermined level of entropy.

27. The article of manufacture of claim 25, wherein the machine-accessible storage medium further comprises sequences of instructions that, when executed, cause the electronic system to cause the authenticating device to transmit the one or more signals to initiate the false authentication attempt.

28. The article of manufacture of claim 27, wherein the sequences of instructions that, when executed, cause the electronic system to cause the authenticating device to transmit the one or more signals to initiate the false authentication attempt comprise sequences of instructions that, when executed, cause the electronic system to request data that the authenticating device transmits only after determining that a requestor is authorized to receive the data.

29. The article of manufacture of claim 27, wherein the sequences of instructions that, when executed, cause the electronic system to cause the authenticating device to transmit the one or more signals to initiate the false authentication attempt comprise sequences of instructions that, when executed, cause the electronic system to request access to data to which the authenticating device provides access only after determining that a requestor is authorized to access the data.

* * * * *